(12) United States Patent
Butler

(10) Patent No.: US 7,870,245 B2
(45) Date of Patent: Jan. 11, 2011

(54) DELIVERY CONTEXT AWARE ACTIVITY ON NETWORKS: DEVICES, SOFTWARE, AND METHODS

(75) Inventor: Mark Henry Butler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1441 days.

(21) Appl. No.: 10/695,948

(22) Filed: Oct. 30, 2003

(65) Prior Publication Data

US 2004/0215757 A1   Oct. 28, 2004

(30) Foreign Application Priority Data

Apr. 11, 2003   (GB) .................................. 0308395.3

(51) Int. Cl.
*G06F 15/173*   (2006.01)
(52) U.S. Cl. ....................................... 709/224; 709/223
(58) Field of Classification Search .................. 709/224
See application file for complete search history.

(56) References Cited

U.S. PATENT DOCUMENTS

| 5,581,704 | A | | 12/1996 | Barbará et al. |
| 5,732,240 | A | * | 3/1998 | Caccavale ................... 711/118 |
| 2002/0032754 | A1 | * | 3/2002 | Logston et al. ............. 709/219 |
| 2002/0116642 | A1 | | 8/2002 | Joshi et al. |
| 2003/0055946 | A1 | * | 3/2003 | Amemiya ................... 709/224 |

FOREIGN PATENT DOCUMENTS

WO    WO 00/55783 A1    9/2000

OTHER PUBLICATIONS

Karanjit S. Siyan, Ph. D., Windows NT Server: Professional Reference, 1995, pp. 404-411, 980-985.*
Greg Shultz, "Configure IT Quick: Give the PathPing utility a GUI front end", Jul. 23, 2002. p. 1-19.*

* cited by examiner

*Primary Examiner*—Hassan Phillips
*Assistant Examiner*—Ryan J Jakovac

(57) ABSTRACT

Software (42) which when run on a processor (40) of a networked resource server (14', 18', 20') reads delivery context aware related data from a contact log of said server and processes said data to produce processed acquired data relating to delivery context aware requests for resources made of the server, and which software causes said processed acquired data to be transmitted out of a network port (58) of the server proactively, without an input trigger signal from outside of the server.

17 Claims, 9 Drawing Sheets

DELIVERY CONTEXT AWARE ACTIVITY ON NETWORKS: DEVICES, SOFTWARE, AND METHODS

FIELD OF THE INVENTION

This relates to delivery context aware activity on networks, and includes, non-exhaustively, networks, devices, software (computer program product), and methods related to delivery context aware activity.

BACKGROUND

There are a great many different kinds of devices that can connect to Wide Area Networks, for example (but not limited to) the World Wide Web, or Internet. Different devices have different capabilities for operating on data they receive, for example to present it to a user. Common ways of presenting information to a user include on a display screen or using audio microphones, or both. Different devices need to operate upon data to be presented to a user with the data presented in different formats or protocols. For example, the screen size, number of pixels, audio frequency output range, colour capability, data reading rate, etc. may differ between devices. Also devices connected to a network may have different input, output, hardware, software, network and browser capabilities. Thus the creator of a network-accessible document, or work, has difficulty in designing one single work suitable for presentation to a user on all possible devices that may be connected to the network. As the number of devices accessing a network increases the problem of enabling a work to be presented to users on the increasing number of different types of devices gets worse.

A solution is to create a separate work, with device specific formatting, for each possible kind of device that can access the network, and have a data content server identify the requesting device that is requesting a work, and serve out the requested work in the format applicable to the requesting device. This has been done at present, but as new devices become available the work involved grows. It is not only end user devices such as mobile telephones, personal digital assistants (PDAs), PCs, laptops, etc. that require format adjustment of the data work, but also intermediaries in the telecommunication chain may also impose a need for specific format requirements (e.g. routers, or relay computers).

A desire has emerged to make network accessible works, e.g. web pages, easier to serve out and design to at least some degree: to have works be at least partially device independent by having works be accessible by a range of devices without having to store the whole work and serve out the whole work in a separate format for each kind of device with different capabilities.

There are at least three ways to achieve a degree of device independence for data works: Intermediate Adaptation; Client-Side Adaptation; and Server-Side Adaptation.

In order to avoid changing the server that provides a data work, or changing the data work itself, or the client device that receives or consumes it, an intermediary, or intermediaries, in the content delivery chain of communication between the server and the client can adapt the data work they receive from the server to make it more suitable for the client before transmitting it on. Transcoding proxies can, for example, transform the data work, for example, transforming image formats, or subsets of mark-up language. A practical example of this is to enable data-enabled telephones access to web sites by either omitting a server's full-resolution colour images or transcoding them into low resolution, or monochrome versions, depending upon the client telephone's capabilities.

Client-Side adaptation involves, typically, having a web browser (as an example of a network-accessing agent) adjust the presentation of data works on its client device. Client-Side adaptation code works in an environment where the capabilities of the client device are known, and modifies the received data (e.g. from a server or other data work supplying device) to allow the client device to use it. An example is modification of a screen image to suit the screen size of a device. Sometimes this may be achieved by omitting parts of the web page/data work that has been received. This is wasteful of delivery bandwidth.

A further option is Server-Side adaptation where the data work server is adapted to change what is served out dependent upon a knowledge of the capabilities of the requesting client device. Server-Side adaptation retains to the server control of what is served out. The data works provider may be able to provide multiple versions of the work to be served out, suitable for different categories of delivery context, or may have a basic core work and apply modifications to that work based upon different categories of delivering context.

Factors that affect the delivery context include the data work delivery devices capabilities, the network characteristics, (including if applicable the characteristics of networked devices that form part of a data work delivery pathway in the network), the client device capabilities, and if applicable the condition of user-set settings available on the client device: things which affect the successful receipt by a client device of data representative of a selected data work. The delivery context includes one or more, or all, of the foregoing (which is not an exhaustive list).

Delivery context aware supply devices, such as data work supply servers, can evaluate at least some delivery context information applicable to a request for a work from a client device and can tailor the data they supply depending upon the evaluated delivery context. Delivery context aware devices may be able to evaluate a plurality of, or all of, information relating to: data work (or resource) provider device capabilities; network characteristics; characteristics of devices that form part of a delivery pathway in the network; client device capabilities; the condition of configurable settings on the client device or other devices in the pathway from work (or resource) server to client device.

There are currently at least two standards used by client devices to describe their capabilities to data work supply devices, such as web servers: Composite Capabilities/Preferences Profile (CC/PP) (created by the world-wide web consortium), and User Agent Profile (UAProf) (created by the WAP forum). CC/PP and UAProf enable a client device to specify its capabilities, and enable intermediary devices to specify their capabilities. These capabilities, along with the capabilities of the network service between the client device and the work supplier device, comprising the delivery context, can be used by delivery context aware resource supplier devices to perform content specialisation (i.e. adapt, select, or generate content based on the delivery context information), as discussed.

Using the Internet as an example, most devices on the Internet use HTTP, a stateless protocol, to retrieve content from data work supplier servers. Both CC/PP and UAProf capable devices have to convey their delivery context to the server as part of every HTTP request. If the entire delivery context information, known as the "profile", was within each request then these requests from the client devices would be network inefficient; a lot of data would be communicated with each request. CC/PP and UAProf break up the profile into two sections: the reference profile, representing a standard profile for that kind of client device, and a list of perturbations, or overrides, specific to the specific instances of the kind of device, specific to the actual client device making the request. These are known as the "profile-difference" (or profile-diff). The reference profile is associated with a unique web location, the URL (Uniform Resource Locator) that is the network address for an actual instance of the profile on a networked web server known as the profile repository. The profile repository may be supported/controlled by an organisation associated with the client devices (e.g. the manufacturer of the devices), or by an organisation associated with the network provider (e.g. the telecommunications network owner), or by another organisation (e.g. the ISP).

When a delivery context aware work supply device, such as a server, receives a request for a data work (e.g. a HTTP request) from a client device which has conveyed with it delivery context information it currently retrieves the reference profile and merges it with the profile-diff in a profile resolution operation to establish the profile of the target client device.

Servers are known to cache reference profiles in a local memory (local to the servers meaning that the memory is accessible without incurring a significant telecommunications delay) to reduce the time, and/or bandwidth, needed for profile resolution. Retrieving a reference profile from a local cache is more efficient than retrieving it repeatedly from a remote profile repository over the Internet.

However, the above reference profile/profile-diff resolution process can have difficulties. For example, if a profile repository is unreachable and a profile that is needed is not already in the more local cache of a data content, or work server, the server may not be able to create a profile for the requesting client device and may therefore not be able to serve out a requested work to the requesting client device, either not at all, or not in a format that is known to be acceptable to the client device.

If a server does have a cached reference profile, that profile might be out of date: sometimes changes to a reference profile are necessary (e.g. to correct errors, or to allow for newly available intermediary devices etc.).

It is also likely that servers will encounter client devices which do not implement the appropriate standards correctly, so that the server cannot return useful content.

A further issue is that different kinds of device, for example provided by different manufacturers, use different capability vocabularies. This means that servers must know about the different vocabularies in advance, if they are to serve out resources properly. Alternatively, it is known to have a server retrieve information about a vocabulary from a vocabulary repository. If the vocabulary repository is unavailable the server may be unable to serve out requested resources.

Thus a network may have a plurality of data work suppliers, such as servers, that are context delivery aware, a plurality of data work suppliers that are not context delivery aware, and a plurality of client devices. The performance of the context delivery aware data work supplier devices depends upon how they are set up to behave, and the reliability of links to reference profile repositories and vocabulary repositories.

SUMMARY OF THE INVENTION

According to a first aspect of the invention there is provided a networkable resource server adapted in use to serve out resources to client devices of a network, the server running delivery context aware activity software which causes a report to be produced containing data related to delivery context aware requests for resources received by the server.

"Resources" may as non-exhaustive examples comprise data works (e.g. web pages); or files, which may comprise datastreams (e.g. video or music files), or databases; e-mails; or software for use by a client device (e.g. ring tones for a mobile phone, games): something that a client device has passed to it. A data server, work server, or web page server are all resource servers.

The server may be adapted to transmit the report externally of the server, for example via a network port of the server. As an alternative, the sever may be able to download the report onto a data carrier or other data transmission media, such as a disk, or display it on a screen. The report may comprise predominantly, or only, delivery context aware-related or influenced data.

Data relating to delivery context aware requests may comprise unprocessed, or substantially unprocessed raw, data relating to delivery context aware requests for resources received by the server, or it may comprise data derived from processing information relating to delivery context aware requests for resource. Unprocessed data relating to delivery context aware information may comprise one or more of the following: information relating to a successful serving out of a requested resource in response to a delivery context aware request for resource; information relating to a successful or unsuccessful attempt to access a reference profile in a local reference profile cache or in a remote reference profile repository; information relating to a successful or unsuccessful attempt to access vocabulary in a local vocabulary cache or a remote vocabulary repository. Processed data may comprise statistics derived from analysing a number of individual events, such as ratio of successfully sent requests for resource that are delivery context aware versus unsuccessful requests; ratio of successful, unsuccessful (or both) delivery context aware requests made of the server in comparison with delivery context unaware requests; number of successful or unsuccessful (or both) requests for resources that are delivery context aware; number of or ratio of attempts to access reference profiles or vocabularies either from a local cache or from a remote repository.

The server may have a data log held in a data log memory, the data log being adapted to store data on activity of the server, including information on delivery context aware activity, and the delivery context aware activity software may be adapted to interrogate the data log to obtain the data related to delivery context aware requests for resources received by the server.

The server is preferably adapted to proactively send out said report onto the network to which the server is connected. The report may relate to a single context delivery aware request for resources, but more likely it will relate to a plurality of, or many, delivery context aware requests for resources, possibly 10, 50, 100, 500, 1,000 or more. The report may include data relating to delivery context unaware requests for resources, as well as delivery context aware requests.

The server may be adapted to send out said report upon receipt of a report request signal from externally of said server, e.g. via a network port.

According to a second aspect of the invention there is provided a method of network management comprising obtaining data related to context delivery aware requests for resources made on the network, analysing the data, and taking an action from the group: (i) generating a control signal adapted to control a network element; or (ii) generating a report containing information indicative of the level of delivery context aware activity on the network.

The method may comprise modifying the size or contents of a reference profile cache of a resource server responsive to an assessment of the level of usage of reference profiles in said reference profile cache. The assessment may comprise one or more of: assessing a level of deletes of reference profiles in said cache; accessing a frequency of use of specific reference profiles.

The method may comprise seeking a reference profile and/or vocabulary from an alternative reference profile repository or vocabulary repository, for example if problems in seeking the reference profile and/or vocabulary are determined. This could be switching over to seek all kinds of reference profiles/vocabulary that were previously to have been sought from a first repository to being sought from a second, different repository; or only for some of the reference profiles/vocabulary that were previously sought from the first repository, or for only those profiles/vocabulary for which there is experience of problems in obtaining them from the first repository.

According to another aspect of the invention there is provided a method of managing a resource server on a network comprising assessing delivery context aware activity involving said server.

Responsive to said assessment the server may be caused to modify a cache reference profile memory, possibly by altering the size of the cache memory (larger or smaller), and/or by altering the identity of reference profiles held in the cache memory.

Responsive to said assessing, the server may be caused to seek a reference profile from a different reference profile repository to that from which the server has previously sought the reference profile.

Responsive to said assessing, the server may be caused to seek a vocabulary from a different vocabulary repository to that from which the server has previously sought vocabulary.

According to another aspect of the invention there is provided computer program product, or software, which when run on a processor of a networked resource server, acquires data relating to delivery context aware requests for resources made of the server.

"Computer program product" and "software" are used interchangeably in this patent.

By "acquires" is meant that the computer program product, or software, obtains the data from a source such an activity log of the server, or acquires the data by being sent the data (typically in addition to the data being sent to the activity log).

The computer program product preferably causes data relating to delivery context aware requests for resources to be transmitted out of the server, possibly onto the network. The computer program product may be adapted to cause the data to be transmitted out of the server via a network port, or to write the data to a data carrier (e.g. disc) to be removed from the server in order to cause the data to be transmitted out of the server.

The computer program product may acquire raw, unprocessed, data relating to delivery context aware requests, or it may process delivery context aware related data to acquire derived data derived from other data relating to delivery context aware requests, said derived data still being data relating to delivery context aware requests.

The computer program product may be adapted to extract said delivery context aware related data from a memory of said server. The computer program product will in many embodiments, but not all, be adapted to cause acquired data to be sent out of said server, possibly via a network port.

The computer program product may be adapted to cause acquired data to be sent out of the server automatically or proactively, without an input trigger signal from outside of the server, and/or it may be adapted to cause said acquired data to be sent out of the server in response to a trigger signal received from outside of the server.

The computer program product may be adapted to evaluate acquired data and to cause the processor of the server to take an action dependent upon evaluation of said acquired data. Said action may comprise selecting a network address representative of a reference profile repository, said address to be used in preference to another network address for a reference profile when said processor seeks a reference profile for resolving a client device profile responsive to a delivery context aware request for resources.

The computer program product may be adapted for use with a server having a reference profile memory, and said action may comprise changing said reference profile memory. The software may be adapted to cause the reference profile memory to increase or decrease in size responsive to an evaluation of acquired data relating to delivery context aware activity involving the server. The identity of the reference profiles stored in the server referenced profile memory may be caused to change by its software/computer program product. Reference profiles may be deleted from the memory. Reference profiles may be added to the memory.

If a server does cache profiles then it will make the overall performance of the server worse than it needs to be if it has too much of its memory and processing power used in maintaining the reference profile cache. It would not be helpful to have a large portion of its reference profile cache dedicated to client devices that are hardly ever seen by the server. If a server does not have enough of its caching capabilities available for client devices that are seen frequently then there may be a negative impact on its abilities to serve out resources to such "popular" devices.

The said action may comprise selecting a network vocabulary address representative of a vocabulary repository, said vocabulary address to be used in preference to another network address for vocabulary when said processor seeks vocabulary responsive to a delivery context aware request for resources.

The computer program product may evaluate whether the server successfully retrieves reference profiles. This may be determined by whether or not a context delivery aware request for resources is successfully met by the server. If it is not possible to serve out a context delivery aware request for resource due to an inability to resolve the profile of the client device, the computer program product/software may log this.

The computer program product may monitor the frequency of deletes in a profile cache of the server. This information may be instrumental in determining whether the size of the cache is too low. If the level of deletes meets or exceeds a threshold value the size of the cache may be increased (optionally automatically by the control processor of the server, or alternatively by a systems administrator (human)).

The computer program product may evaluate the level of usage of reference profiles in a reference profile cache of the server. The computer program product may cause reference profiles that have a usage level below a threshold to be deleted from the cache. A usage level parameter indicative of the usage of a reference profile may be established for each reference profile by the software/computer program product. The usage level parameter may comprise the ratio of the time since a specific reference profile was entered into the profile cache and the number of times the particular reference profile has been retrieved from the cache since it was entered into it. An alternative is to monitor the time since a reference profile was last retrieved.

The computer program product may evaluate the fraction of devices requesting resources from the server that are delivery context aware in comparison with the total number of requesting devices, or it may evaluate the fraction of requests for resources that are delivery context aware compared to the total number of requests for resources received by the server. Instead of comparing delivery context aware related activity with total activity, there could be a comparison with delivery context unaware activity: delivery context aware activity compared with total activity is, of course, related to delivery context aware activity compared with delivery context unaware activity.

The computer program product may monitor whether client devices are using a profile that contains errors (e.g. the profile is not a valid CC/PP or UAProf description). Whether or not a client device profile contains errors may be determined at profile resolution: if the profile cannot be resolved this is an indication that it may contain errors.

The computer program product may monitor whether a profile references a vocabulary description that either the server has not been preconfigured to recognise or that it cannot retrieve from a vocabulary reference. This is determinable during profile resolution. The computer program product/software may monitor the fraction of client devices, or requests for resource, which use profile differences.

The computer program product/software may monitor the number of profile differences used in an individual request for resources. This is indicative of the number of delivery context aware devices in the communication chain between the client device making the request for resources and the resource server.

The computer program product may be arranged to identify an inability to obtain a requested reference profile or vocabulary from a reference profile or vocabulary repository and to cause the server to request the reference profile or vocabulary from an alternative repository.

The computer program product is preferably adapted to convey at least some, and possibly all or any combination of the above monitored information, to a remote monitor processor.

The computer program product/software may be provided on a data carrier, such as a disc, solid state memory device such as EEPROM, CD-ROM, or an electromagnetic wave data carrier, or an electrical signal data carrier.

According to another aspect of the invention there is provided central network monitoring computer program product adapted to be run on a processor of a central network monitoring processor, the central network monitoring computer program product comprising delivery context aware activity analysis computer program product adapted to process delivery context aware related data input to said central network monitoring processor by networked resource servers.

The central network monitoring computer program product/software may be adapted to collate data from a plurality of networked resource servers and to provide a statistical analysis of overall network activity involving delivery context aware activity. The computer program product may produce delivery context aware network activity influenced parameters, data, reports, or control signals.

According to another aspect of the invention there is provided a network having a plurality of resource servers, a central network delivery context aware activity monitor; the resource servers being adapted to monitor their own delivery context aware activity and to convey a report relating to delivery context aware activity with which they have been involved to the central delivery context aware activity monitor.

The central network delivery context aware activity monitor may be adapted to generate a report for review by a system administrator and/or a control signal to alter, automatically, a networked component.

The resource servers may be adapted to report said reports relating to delivery context aware activity with which they have been involved to said central network delivery context aware activity monitor automatically without requiring an external prompt.

According to another aspect of the invention there is provided a method of providing consulting services relating to network management comprising using software in accordance with a previous aspect of the invention to provide information relating to delivery context aware network activity, and providing advice using the information so obtained.

It is possible to advise manufacturers of devices about problems with their profiles or vocabulary, or telecommunications providers about problems with their equipment. It is possible to advise network systems companies about problems when particular client devices are used on their networks. This can enable people other than the device manufacturers to put remedial solutions in place. For example, if a particular client device was known to have a reference profile error, but the manufacturing company had not corrected the error in the devices, either the manufacturer or ISP, or telecomms network company, or network portal company, or some other entity could provide instructions to resource servers to use the correct reference profile even though requests for resource from the client devices are accompanied by erroneous reference profiles.

There may be a reason why a network service provider may wish to correct errors in profiles for devices that they do not own. It may reduce complaints they receive from their customers.

According to another aspect of the invention, there is provided a method of trading in network-related usage and/or performance and/or network composition and/or device performance information comprising acquiring said information using software probes on networked resource servers to extract delivery context awareness-related network activity data relating to activity involving the particular resource server upon which said probe resides, reporting said data to a location externally of said resource servers, using reported data to produce said network-related usage and/or performance information, and trading in said information.

Preferably said data from said resource servers is reported to a common processor for bringing together in a common report, possibly presenting network activity-related statistics and/or information relating to the performance of particular kinds of networked devices.

It is envisaged that selling information derived from a knowledge of network activity relating to delivery context aware requests for resource, or trading it for something of value, is a business opportunity.

It will be appreciated that storing reference profiles in local cache memory for too long has problems: they can get out-of-date. Manufacturers may change the profile of a device. Individual device owners may change the customer-settable settings of their device (e.g. a WAP mobile telephone) and hence change its profile. It may be desirable to delete a reference profile for a device from a local cache memory if it has not been successfully used to serve out resource within a set period (e.g. within the last 24 or 48 hours). This will require refreshing of the reference profile in the cache, ensuring an up-to-date profile.

According to another aspect of the invention there is provided a method of managing a network having delivery context aware client devices and resource servers, comprising having the resource servers process data relating to delivery context aware activity with which they were involved locally at the resource servers, and forward a report containing information derived from their delivery context aware activity to a network-wide delivery context aware activity monitor, and having the monitor process the individual reports from the resource servers to produce an output result from the monitor that is influenced by delivery context aware activity involving a plurality of the resource servers.

The output result may be a control signal, or a report for human or processor consumption.

According to another aspect of the invention there is provided a method of monitoring the performance of resource servers on a network comprising monitoring consequential requests made over the network by a resource server in response to the resource server receiving delivery context aware requests to serve out resource, the consequential requests made by the resource server being request for data to enable the server to serve out the resource in an appropriate delivery context aware manner.

The success or failure of the resource server in serving out resources in the appropriate delivery context aware manner may be monitored.

According to another aspect of the invention there is provided a method of managing resource servers on a network which receive delivery context aware requests for resources from client devices and dependant thereupon create their own network secondary requests for client device capability-related information in order to customise the data they serve out for suitability with the requesting client device, the method comprising monitoring the secondary requests to determine levels of operational efficacy of the secondary requests and/or statistics relating to secondary requests.

According to another aspect of the invention there is provided a method of managing a server in a network where the server serves resources to a requesting device which has made a primary delivery context aware request to the server for resources, the server responsive thereto making its own secondary request for reference profile and/or vocabulary data from another server, the method comprising monitoring operational statistics relating to the success or failure of the primary request.

According to another aspect of the invention there is provided a networkable resource server adapted in use to serve out resources to client devices of a network, the server having a resource request monitoring computer program product which when run on a processor of the server causes a report to be produced containing data related to or influenced by at least one of the group:
(i) whether the requests for resource contain information relating to the capabilities of a client device to receive and/or process and/or display data;
(ii) the capabilities of the resource server to output resources having different network transmission and/or data-presentation characteristics;
(iii) network transmission and/or data-presentation characteristics of an intermediary device in said network disposed in a communication pathway between said client device and said resource server;
(iv) the characteristics of settings of configurable settings of the server, or client device, or an intermediary device in a communication pathway in the network between the resource server and the client device.

According to another aspect of the invention there is provided a networkable resource server adapted in use to serve out resources to client devices of a network, the server having a resource request monitoring computer program product which when run on a processor of the server causes a report to be produced containing data related to or influenced by at least one of the group:
(i) success rate of the server being able to obtain reference profiles;
(ii) the level of churn occurring in a reference profile cache of the server;
(iii) the level of usage of individual reference profiles in a reference profile cache of the server;
(iv) the proportion of requests for resource received by the server that contain delivery context information;
(v) errors detected in reference profiles;
(vi) vocabulary in reference profiles that is unrecognised by said server;
(vii) the proportion of requests for resources received by the server that use profile differences;
(viii) the proportion of client devices that make requests of the server for resources that use profile differences;
(ix) the number of intermediary devices in a communication chain from a client device to the server that influence the delivery context information of the requests;
(x) the number of configurable settings of devices involved in making and communicating a request of the server for resources, and in returning the requested resources to the client device, that influence the delivery context information in the request.

With hindsight, once attention has been focussed upon monitoring context delivery transactions, which has never been a focus before, it can be noted that current delivery context aware servers sometimes have simple contact logs which contain a record of at least some failures or errors in delivery content in response to client device requests. However, the known servers only display in real time the occurrence of such failure events on a display console, or record the events in a passive electronic contact log which is inspectable upon making a request to inspect it. Hitherto such logs have not proactively done anything with the error or failure data: they have never proactively pushed this data out of the server to communicate it with an external device, nor has it been known previously to have routine requests made to the server seeking such error/failure data relating to context aware delivery activity.

BRIEF DESCRIPTION OF THE DRAWINGS

There now follows a description of embodiments of the invention, by way of example only, with reference to the accompanying drawing, of which:—

DETAILED DESCRIPTION OF THE DRAWINGS

Figure 1A:
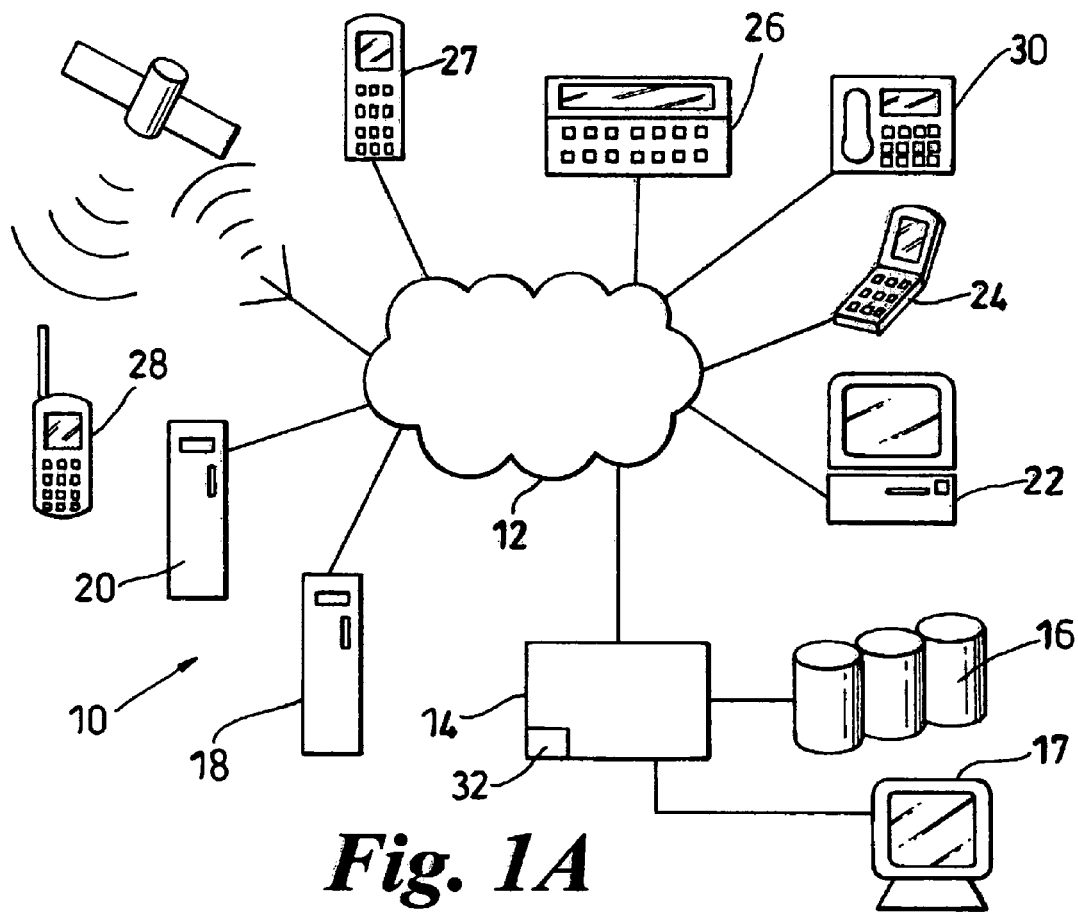
FIG. 1a shows a prior art network comprising a number of client and server devices connected to the internet.
Figure 1B:
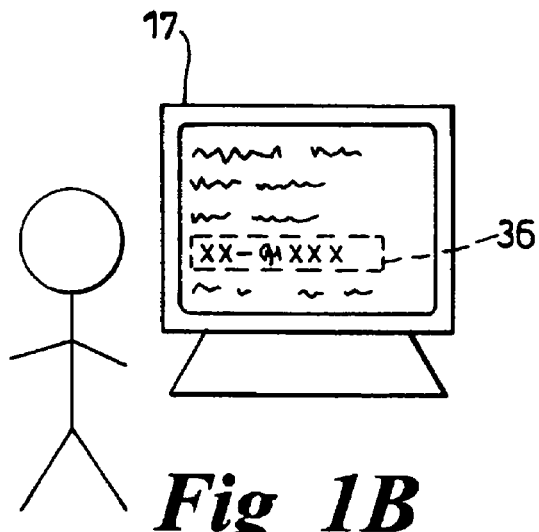
FIG. 1b shows a prior art display screen displaying data in real time.

FIG. 1 shows a prior art network 10 comprising a number of client and server devices connected to the Internet 12. By way of example, the server devices, comprising data work, or resource, providers include a first resource server 14 having access to memory 16, typically disk memory, containing data works to be served out as resources, and connected to a display console or screen 17, and second and third similar resource servers 18 and 20 (not drawn in the same way as server 14, but having similar arrangements); a personal computer 22; a cellular mobile telephone 24; a personal digital assistant 26; a second kind of cellular mobile phone 27 (e.g. from a different manufacturer to that of telephone 24), a satellite mobile telephone 28, and a land-line telephone 30.

Figure 1C:
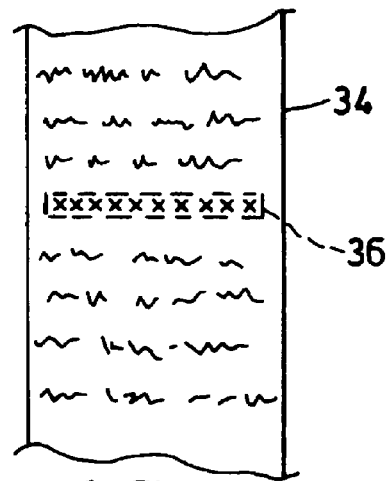
FIG. 1c shows a prior art print out from an event log.

The servers 17, 18, and 20 have event logs 32 which record warnings or error messages involving the input/output of data to or from the servers. FIG. 1C schematically illustrates a print out 34 from such a log 32. In amongst error/warning data relating to all Internet addresses which were in communication with the server 13, is data 36 relating to the fact that a particular error event was in connection with a client device which informed the server of the delivery context of that client device.

The servers 17, 18 and 20 also, in addition to recording transactional data in their data logs, also display the data 36 in real time on the display screens 17 (see FIG. 1B), with the data being available for a human systems manager to see as they observe the screen. However, server 14 does not communicate the content of its log relating to context delivery aware activity externally of the server (except to the real time limited display screen 17), nor does it process or analyse the context delivery aware activity information: it just sits in the log and no use of it is made. The same applies to servers 18 and 20: they each have their own context aware activity data in their log, but do not communicate it to another processor or process it themselves.

Figure 1D:
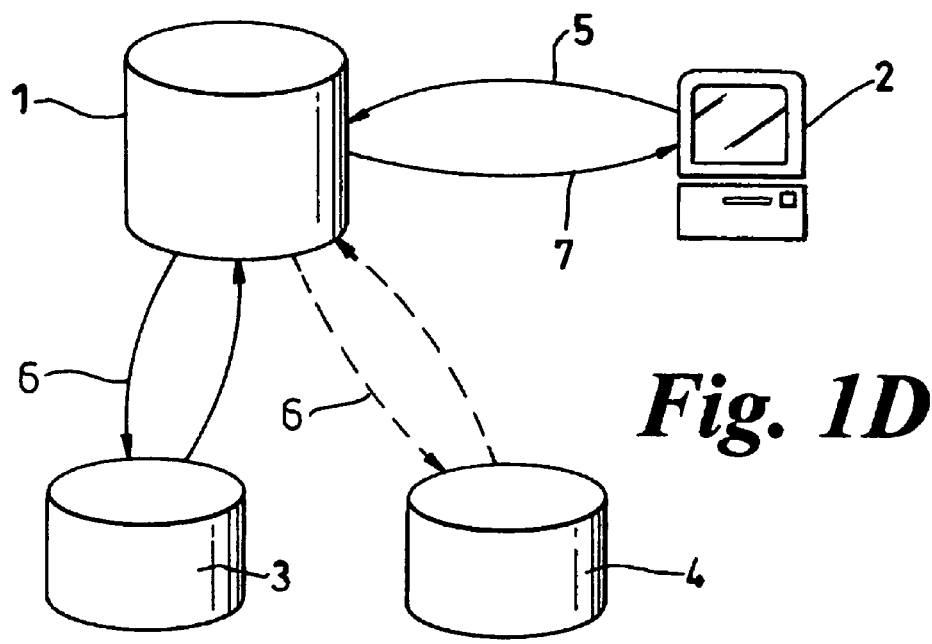
FIG. 1d shows how a prior art resource server uses a profile repository server and vocabulary server to respond to a delivery context aware client device.

FIG. 1d, also prior art, shows how a resource server 1 uses a profile repository server 3 and vocabulary server 4 to retrieve a profile for use in responding to a delivery context aware client device 2. A primary request 5 is sent from the client device 2 to the resource server 1 for delivery context aware resource. The resource server 1 then sends out a secondary request 6 to a profile repository server 3 and/or a vocabulary server 4 for delivery context-related data. The profile repository server 3 and/or vocabulary server 4 respond to the resource server 1 with the specific profile and/or vocabulary for the client device, and the resource server can then serve out 7 the resource created for the specific client device 2. This arrangement is described later in more detail in relation to the embodiment of the invention described in FIG. 4 which uses a profile-diff approach, as well as the present invention.

Figure 2:
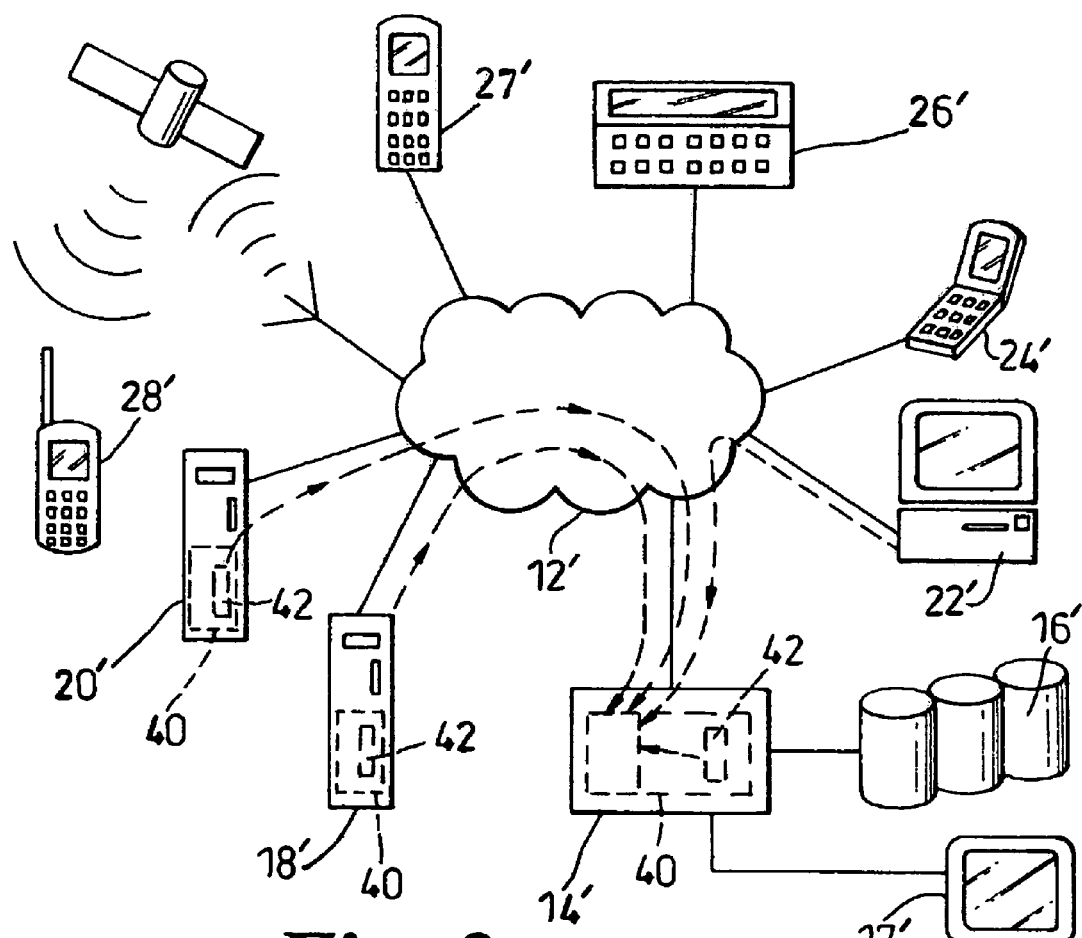
FIG. 2 shows a network where delivery context aware activity is monitored by computer program product, or by software, probes on servers.

FIG. 2 illustrates an embodiment of the present invention and shows the same client devices as FIG. 1, but the data work, or resource provider, servers 14', 18' and 20' have running on their control processor 40 computer program product, or software, in this example a monitoring routine 42, which is adapted to produce a report related to delivery context aware activity involving the servers and relating to delivery context aware requests for resources received by the respective servers. Examples of data relating to delivery context aware requests for resources are given later. In this example the reports are sent by the servers 14', 18' and 20' to a master monitoring processor, which in this example is in server 14', via the Internet 12. Server 14' uses the delivery context-related data relating to the network's resource providers in order to improve network performance, or to be able to give reports which can be used to improve the overall exercise of communicating with context delivery aware devices over the network.

It will be appreciated that there are two new activities being performed: each server is monitoring its own activity for context delivery aware-related information, and also each server is communicating that information to a central processor for central collation. These activities are both performed in this embodiment, but each could be performed independently of the other, in other embodiments.

In the example of FIG. 2 the software probe 42 produces a report, or communication, which is transmitted to the master monitoring processor 14' periodically, for example once every minute, informing the master monitoring processor of context delivery related information that has changed since the master monitoring processor was last updated. Alternative frequencies of update in burst communication could be more often or less often than a minute, say for example every 10 minutes.

An alternative to a communication from the servers 18' and 20' with the server 14' being triggered periodically at set times, is to have it triggered by trigger events, such as a temporary memory, such as a FIFO memory, of the server becoming more full than a threshold value (the memory containing data regarding context delivery related events or data derived therefrom), or each specific event that is classed as a context delivery related event could trigger communication of details of that event, or data relating to it or derived from it, as soon as the event is identified.

The report, produced by the software probe 42, of data relating to delivery context aware requests for resources received by the serves, may relate to, or be influenced by, one or more, or any combination of, including all of:

(i) success rate for requests made by the server to obtain reference profiles;

(ii) whether churn is occurring in a cache of reference profiles;
(iii) the level of usage of specific profiles in a cache of reference profiles;
(iv) the proportion of requests for resource received by the server that contain delivery context information;
(v) errors detected in reference profiles;
(vi) vocabulary in a profile that is unrecognised by the server;
(vii) the proportion of requests for resources, or of client devices making requests for resources, that use profile differences;
(viii) the number of intermediary devices and/or settings that influence the delivery context.

Figure 3:
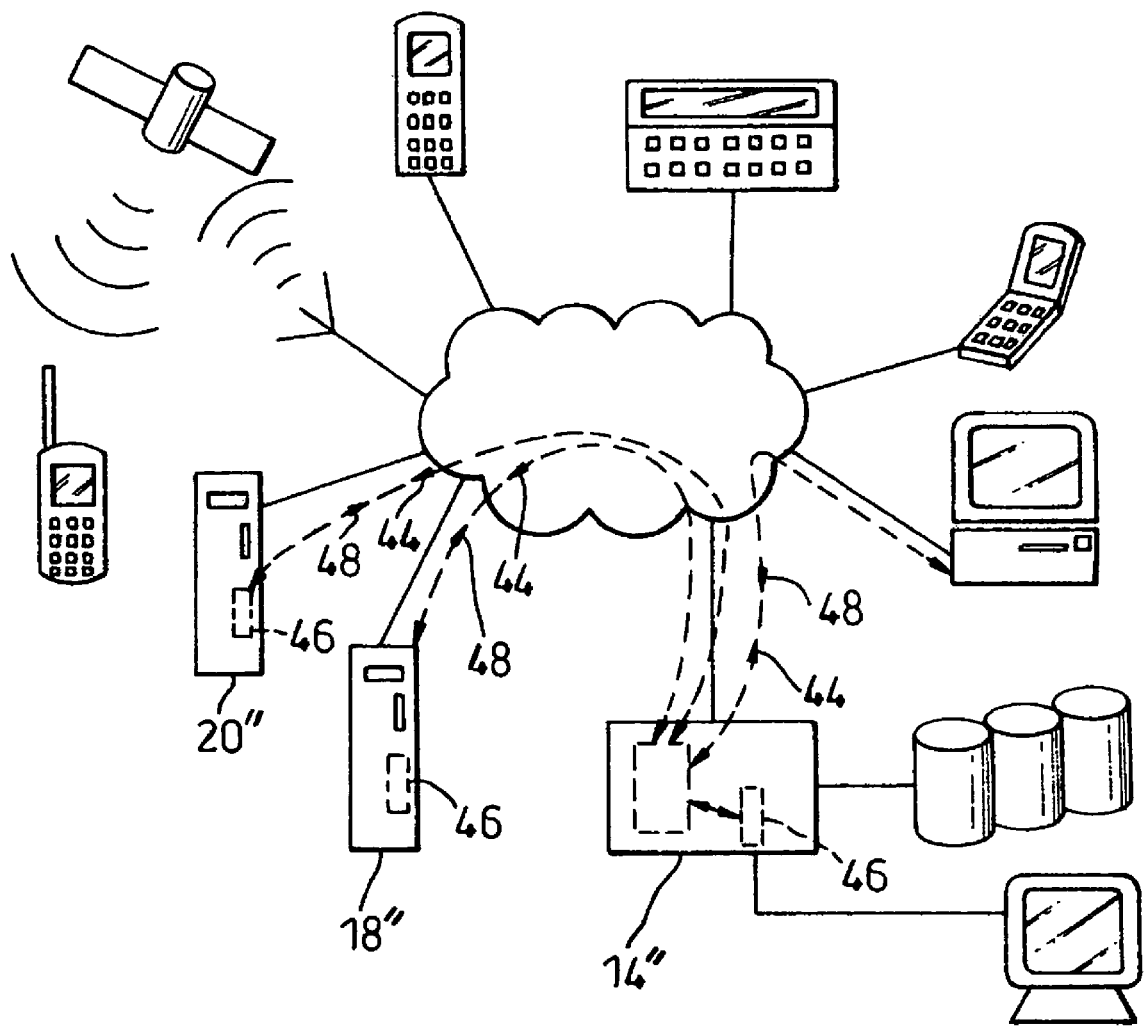
FIG. 3 shows another network similar to that of FIG. 2.

FIG. 3 shows an alternative embodiment in which instead of each server having a monitoring routine running on their control processors which proactively pushes context delivery aware-related or derived data from the individual servers to the central master monitoring server 14', the central master monitoring server, referenced 14" in FIG. 3, requests a report from each server, schematically shown as arrows 44. The individual servers then have report generation routines 46 running on their control processors which access delivery context related information and convey it, or data derived from it, to the master control processor 14", illustrated by arrows 48. Both of these arrangements, the servers proactively pushing context delivery aware-related or derived data to a central monitoring server, and a central monitoring server actively pulling that data from remote servers, are new: the existence of a central monitoring server collating network-wide context delivery aware-related or derived data is new.

Again, the requests for reports from the servers 18" or 20" may be generated periodically, or may be triggered by a particular event.

Figure 4:
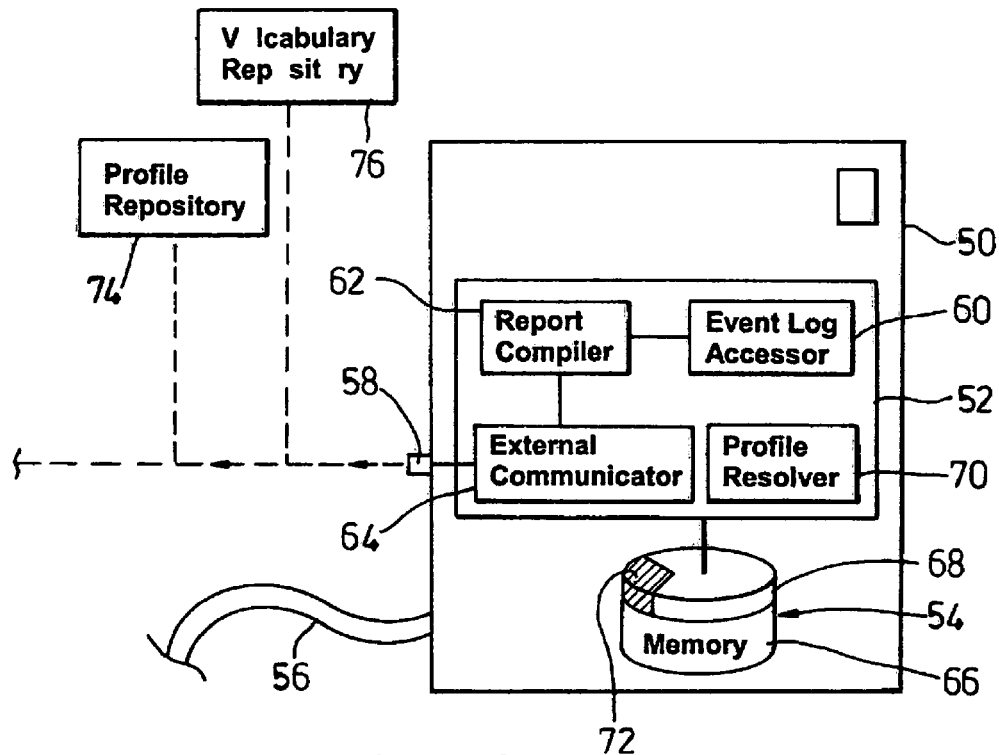
FIG. 4 illustrates schematically a resource provider device with delivery context aware activity monitoring computer program product/software provided on it.

FIG. 4 illustrates schematically a data work, or resource provider (e.g. a server) device 50 having a control processor 52, a memory 54 (internal or external), such as disk memory, a power supply 56, and a network port 58. The processor 52 has agents running upon it which comprise an event log accessor 60, a report compiler 62, and an external communicator 64. The memory 54 comprises a data work, or resource, memory 66, and a data log memory 68. The resource memory 66 contains works available for serving out to the network, such as web pages, video clips, SMS messages, audio output, e-mails, etc. The data log memory includes, amongst other things, details of requests from client devices for resources to be served out, including details to enable it to be determined whether or not the client device was delivery context aware, and to enable it to be determined whether or not the requested resource was successfully served out.

FIG. 4 also shows profile resolution, as discussed earlier in relation to FIG. 2. The server 50 has a profile resolver 70 which, in use, when it receives from a context delivery aware client device details of a profile-difference, and details of a reference profile relating to that client device, calls the reference profile from a cache memory, referenced 72, of the server 50 and creates the profile of the client device using the profile-diff transmitted to the server 50 by the client device and the cache-retrieved reference profile. The evaluated/constructed client device profile is then used by the control processor 52 to select or tailor the resource served out by the server 50. The profile resolution using a profile-diff and profile repositories is, in and of itself, prior art, as discussed in relation to FIG. 2, but not when used with added value delivery context aware monitoring/statistic evaluation.

If the profile resolver 70 is not supplied with the relevant reference profile from the local cache 72 it causes the device to request the reference profile from a remote profile repository 74, via the network port 58. If the profile-diff, or the reference profile, have vocabulary terms that are not recognised by the control processor 52, the processor 52 requests information on the vocabulary from a vocabulary repository 76, again over the network via the port 58.

Of course, there may be a vocabulary cache (not shown) local to the server 50, and the processor 52 may try to obtain vocabulary from that before trying outside of the server 50.

The report compiler 62 is adapted to generate a report relating to delivery context aware activity with which the server 50 has been involved.

The event log accessor 60 is adapted to query the event log 68 to extract data relating to activity involving delivery context aware client devices and supply that data to the report compiler which processes the raw data to produce a report of metadata (data about data) relating to delivery context activity. The external communicator 64 is adapted to communicate the report generated by the report compiler 62 to a remote processor for subsequent analysis/further processing.

The report compiler comprises a computer program product, or software agent or probe, running on the control processor 52. As previously discussed, a report of delivery context metadata can be proactively generated by the processor 52, or produced upon receipt of a report demand signal from externally of the server 50.

The report relating to, or influenced by, delivery context aware requests for resources received by the device 50 is related to at least one of, or a plurality of, or any combinations of, including all of:
(i) the characteristics of the resource provider (server 50);
(ii) the network characteristics linking the resource provider and the client device;
(iii) the characteristics of the client device itself;
(iv) the characteristics of any intermediary devices in the network pathway between the client device and the resource provider;
(v) the condition of any configurable settings of any of the client device, resource provider, or intermediary devices.

It will be appreciated that the servers 14', 18', 20' and their processors 42 of FIG. 2, and the servers 14", 18" and 20", and their processors of FIG. 3, also have similar capabilities.

In more detail, the software probe running on the processor 52 of the server 50 is adapted to relay the following information from the delivery context aware server 50 to a central monitoring network management system, or information related to or influenced by the following:—
(i) whether the server 50 is successfully obtaining reference profiles. For example, as indication for each successful reference profile retrieved (whether from cache or a remote source) may be given, or only for those retrieved from an external reference profile repository;
(ii) whether churn of reference profiles in the cache is occurring;
(iii) whether the level of usage of specific profiles in the cache is below a threshold level;
(iv) of the networked devices that seek resources from the server, the fraction of those devices that are delivery context aware devices;
(v) whether a networked client device is using a profile that has errors;
(vi) whether a profile for a client device uses vocabulary that the server cannot recognise (either from cache memory or vocabulary resolution from a vocabulary repository);
(vii) the fraction of client devices seeking resources from the server that use profile differences; and
(viii) for each request for resource, the number of different profile-diffs conveyed with the request for resource.

It will be appreciated that other embodiments may provide different delivery context-related information. For example, another embodiment may provide only one of the above, or any number of the above in any combination.

Figure 5:
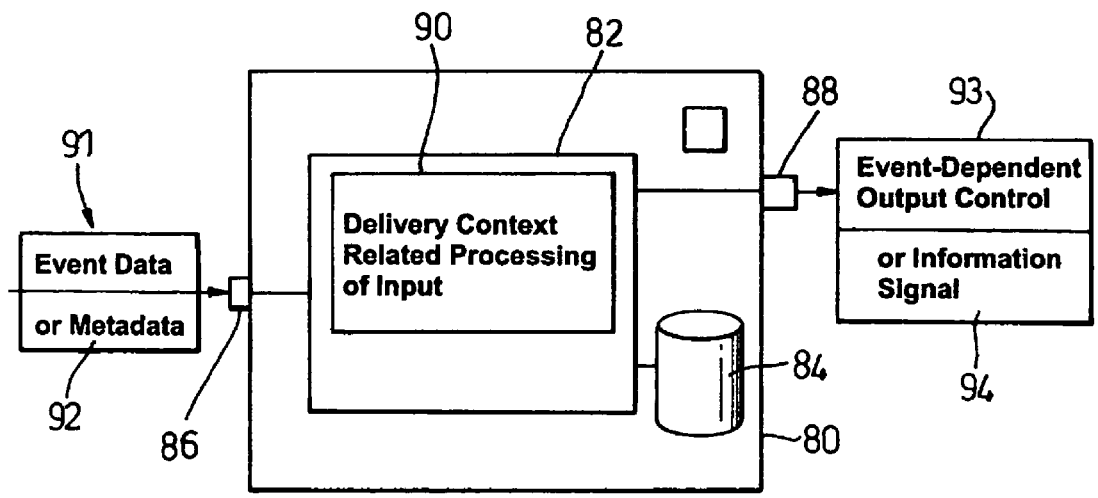
FIG. 5 illustrates schematically a central master monitoring server for monitoring delivery context aware activity.

FIG. 5 shows schematically a network central master monitoring device 80, similar to that of device 14" of FIG. 3. A control processor 82 has access to memory 84 and communicates with an input network port 86 and an output network port 88 (which could be the same port as the input port).

The processor 82 has running on it computer program product, or software, 90 which takes delivery context event related input data 91, or metadata 92, processes it, and outputs either a control signal 93 or an information signal 94, both of which are influenced by delivery context aware activity on the network from which input signals 91 or 92 are derived.

The central monitoring device 80 takes the information it receives from each networkable resource-serving device equipped with a delivery context relaying software probe, such as probe 62, and evaluates the overall network situation. The device 80 may then output a control signal automatically to cause the network to operate differently, and/or it may produce a report for a human system administrator to consider.

It will be appreciated that each server 18, 20, 14, may have its own self-monitoring computer program product/software, similar to computer program product/software 90, which produces outputs based upon what is experienced only by its own server (i.e. servers may have both software 62 and software 90 running on them).

At a more detailed level, let us take the embodiment of FIG. 2 using servers 50 as its servers 18' and 20' and with server 14' running both software 52 and software 82 on its control processor, and consider network traffic. The server 20' receives a request for an Internet page from client device 27', which in this example is not delivery context aware. A request for resources that is not delivery context aware does not, for example, contain a profile, or profile-diff and identification of which reference profile is appropriate, (or the other information discussed on pages 3 and 4). The server 20' serves out the requested web page, which reaches the device 27'. However, because the screen size and overall configuration of the cellular phone 27' is not compatible with the format of the web page the device 27' cannot display it properly. In one example, the device 27' modifies the web page data it receives so as to display at least something useful on its display screen. However, this means that data has been transmitted that is not actually used, which unnecessarily takes up bandwidth. In another example, the device 27' simply cannot display the wrongly formatted web page.

The server 20' keeps a record in its data log memory 68 of the identity or class of the client device (e.g. its URL identity), what web page was requested (information relating to the served out resource), and information indicative of whether the request for resource was accompanied by delivery context profile information or not.

Server 20' also receives a request for a web page from client device PDA 26'. This time the request is accompanied by an indicator indicating the identity of the reference profile and by a profile difference. The server 20' retrieves the reference profile from its cache memory 72 and resolves the delivery context profile of the client device and uses this profile to select an appropriate version of the requested web page from memory 66, or alternatively to retrieve data from the memory 66 and then modify it to tailor it to suit the resolved profile of the client device. The delivery context-influenced data representing the requested resource is then served out to the client device 26'.

The server 20' again records in its data log 68 information regarding the class or identity of the client device (e.g. its URL), information regarding the served out resource, and information to enable an assessment of whether or not the client device was context delivery aware. In this example the log 68 also contains information to determine whether or not the server received a request which used a profile difference; and whether or not the reference profile was available to the server 20' (either from cache or from an external source); and whether the resource server made a request for a reference profile or vocabulary from another external server/repository; and whether or not the profile was able to be resolved; and whether or not unknown vocabulary was encountered in the reference profile or profile-difference.

Many other client devices, delivery context aware and unaware, make requests to serve out content/resources from the server 20' over given period, say a ten-minute period. Once every period (e.g. ten minutes) the software 52 or the server 20' accesses the data log 68 to produce a report giving the parameters (i) to (viii) given on pages 24 and 25, and the report is sent over the Internet to the network system control monitor of delivery context aware activity and usage, the server 14'. The server 14' also receives similar reports from other delivery context information-gathering servers on the network (e.g. from servers 18' and 20').

The server 14' runs computer program product 82 and uses the delivery context-influenced information it has received from the delivery context information gathering servers to produce an output signal (discussed below) that is influenced by, and dependent upon, delivery context aware activity on the network. The output signal may for example be a report to a human, or automatic control signals to networked devices to modify their behaviour.

In this example, the software 82 assesses, for each server, whether adjustments need to be made to the cache memory of reference profiles. Does the cache need to have more reference profiles in it? Does it need fewer reference profiles? Should it contain a specific reference profile? How this can be assessed, in some embodiments, is discussed later. If the server 14' determines that an adjustment to a reference profile in a reference profile cache of a particular server is desirable, it sends out an output signal in the form of a control signal to that server to instruct it to adjust its cache of reference profiles in a specified way.

It will be appreciated that instead of, or as well as, having a central delivery context activity monitoring server produce signals to control the operation of specific servers, the individual servers themselves could have similar self-monitoring and self-controlling software (computer program product) operating upon them. Indeed, for analyses of delivery context aware activity which do not depend upon the input from a plurality of delivery context aware-information gathering servers we may prefer to have a server monitor and control itself locally, dependent upon delivery context aware activity that it itself has experienced. For example, whether or not a particular server's reference profile cache needs adjusting may be something that the local server itself can establish, and in response to which the local server itself can take remedial action. The adjustment in the cache may be an increase or decrease in the number of reference profiles it contains; or the exchange of relatively unused profiles for relatively more popular profiles, for example.

Other things that are delivery context influenced and that may be monitored and actions taken responsive to the monitoring, either locally at individual servers or centrally, include:

identifying when a particular reference profile repository is not satisfactory delivering reference profiles to a server upon request for such reference profiles, and optionally causing the server to seek at least some reference profiles from an alternative reference profile repository;

identifying when a particular server will not be able to serve out a requested resource either at all with its correct delivery context format, or not efficiently, and, optionally, causing a request to that server for the resource concerned to be directed to an alternative resource server that is better able to serve out the requested resource to the requesting client device in the correct delivery context format.

The reason why a particular server may not be able to serve out efficiently a particular resource in a particular delivery context format could be because it simply does not have the capability to serve out in the particular format necessary, or because it is busy and it will be too slow; or because the link to a necessary reference profile is not operating properly, as non-limiting examples.

Not all embodiments of the invention will use all of the features discussed.

Figure 6:
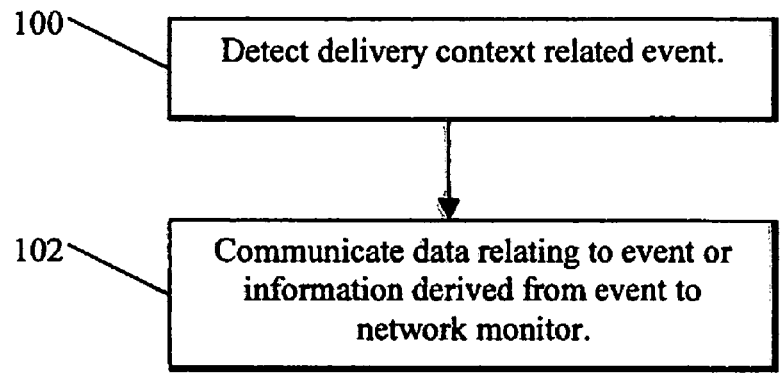
FIG. 6 is a flow chart illustrating one example of how a delivery context related event is communicated to a central network monitor.

FIG. 6 illustrates a process that occurs in one embodiment of a network-connected data content, or resource, server. The server has some way of detecting delivery context-related events, step 100 (for example, but not limited to, the ways discussed in this application). This event is influenced by delivery context related activity involving the server. The server communicates, step 102, data relating to the delivery context influenced event, and/or information derived from the event, to a network monitor (typically, but not necessarily) remote from the server.

It will be appreciated that step 102 could involve transmitting details of the URL of a client device that requested resource from the server and the identity of the actual profile, or reference profile conveyed to the server, and if used, conveying the actual profile-difference. Alternatively, this "raw data" may not be communicated to the network monitor, instead data derived from such activity, or indicative of the occurrence of such activity may be communicated. For example, the server may communicate the fact that it had received a request for resource, that it involved a profile (and optionally that it involved a profile-diff), and optionally that the requested resource was successfully served out. The identity of the client device may not be transmitted at all, for example, or it may be generalised into falling within a category.

Figure 7:
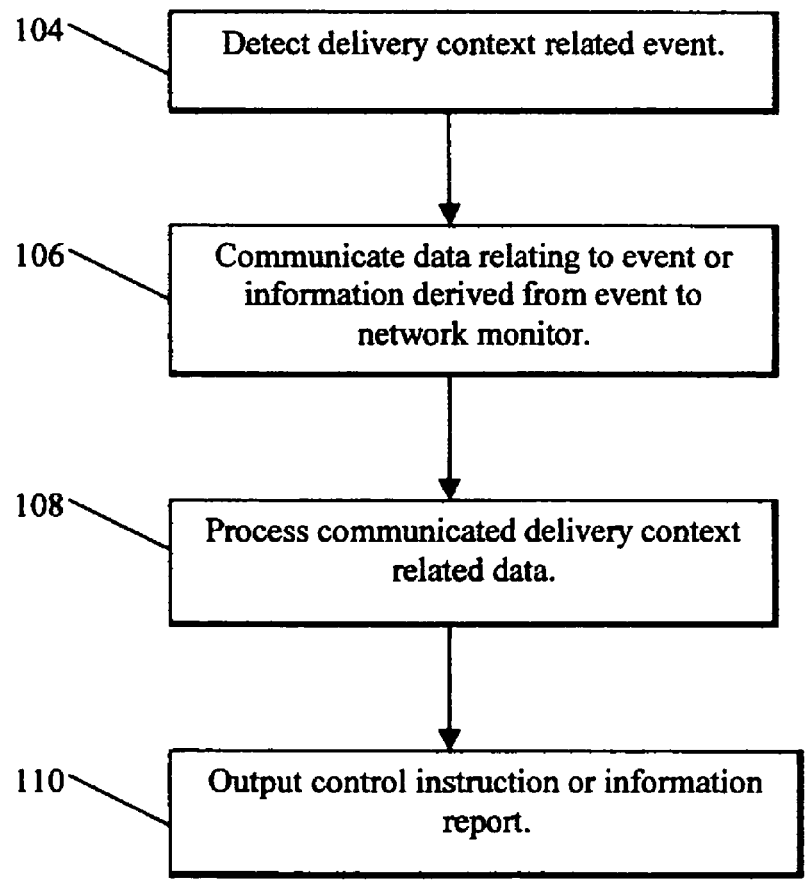
FIG. 7 is a flow chart illustrating the operation of an embodiment in which a delivery context related event is processed and an information report or control instruction is outputted.

FIG. 7 shows a process occurring on another embodiment comprising a network having delivery context resource servers and a central system delivery content monitor. Each resource server detects, step 104 or monitors its own delivery context related events and communicates data relating to those events or information derived from those events to the network monitor, step 106. The network monitor processes the delivery context related data that has been communicated to it, step 108, and outputs, step 110, a control instruction to one or more servers, and/or an information report to a system administrator for them to assess and to decide upon any appropriate action.

Figure 8:
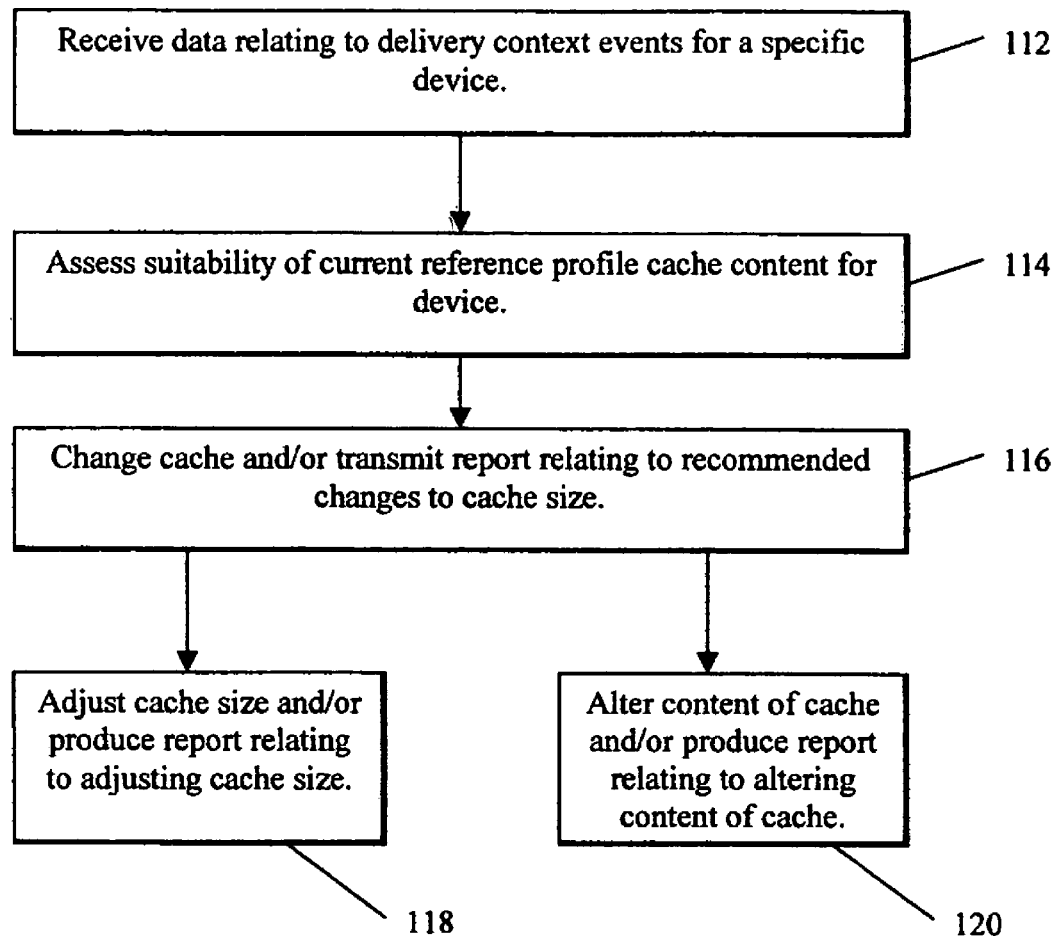
FIG. 8 is a flow chart illustrating the operation of an embodiment in which delivery context related events are used to offset a antecedent regarding the reference profile cache.

FIG. 8 shows a process occurring on the control processor of a resource server, such as server 14', 18' or 20'. The processor receives data relating to delivery context events which involve the resource server, step 112 (typically by inspecting the data log of the server, but there are other ways of gathering such data, for example by causing relevant entries to be made in a specific delivery context report log, possibly by copying or processing relevant data as it is passed to the server's data log).

The control processor of the resource server assesses, in step 114, the suitability of its current contents of its reference profile cache.

If the processor determines that the content of the cache needs altering the processor causes the contents of the cache to be altered and/or produces a report to enable another entity (e.g. another processor or a system administration) to review what to do with the reference cache, step 116.

The change to the reference cache may be to increase its size—allowing more reference profiles to reside in the cache and requiring less telecommunications access to reference profile repositories, or to decrease its size and remove reference profiles from the cache, typically either in order to free up the processor cache memory for other purposes, and to free up the processing power needed to manage the cache memory, thereby typically improving overall performance of the server in serving out resources, or in order to ensure that reference profiles are current, recent, profiles and are not out-of-date. Altering the overall size of the reference cache memory is shown as reference 118 in FIG. 8.

An alternative is to keep the cache size generally constant, but to move specific reference profiles in and out of the reference profile cache, depending upon the level of demand for them, shown as reference 120.

Figure 9:
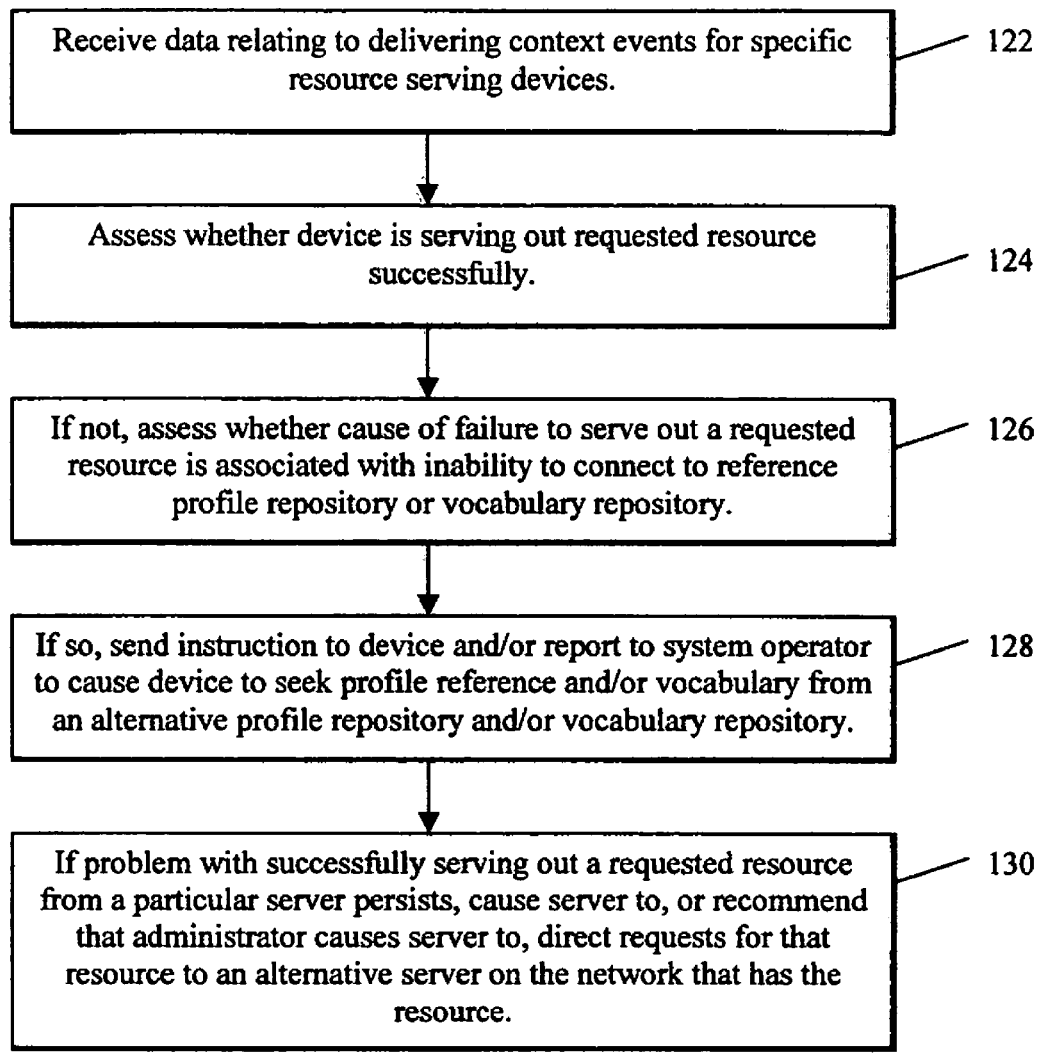
FIG. 9 is a flow chart illustrating the operation of an embodiment in which a device is unsuccessful in serving out a requested resource.

FIG. 9 shows a process occurring on a central system delivery context related activity monitor, for example server 80 of FIG. 5.

The server receives data relating to delivery context events for specific resource serving devices, step 122. It then assesses, in step 124, whether specific resource serving devices are serving out requested resource successfully. If there is a determination at step 126 that a, or some, resource serving device(s) is/are not serving out a requested resource successfully, the monitor then determines whether this is associated with either an inability to connect to an appropriate reference profile repository, or to an appropriate vocabulary repository. If that is determined to be the case, the monitor, at step 128, sends instructions to the resource server to cause it to seek reference profiles (or at least ones identified as being problematic), or vocabulary, from an alternative reference profile repository, or vocabulary repository.

Step 130 of the process is to cause a particular resource server to direct requests for at least specific, and possibly all, resources to another resource server that is not expected to have such severe problems in serving out the specific resource/or resources generally.

Figure 10:
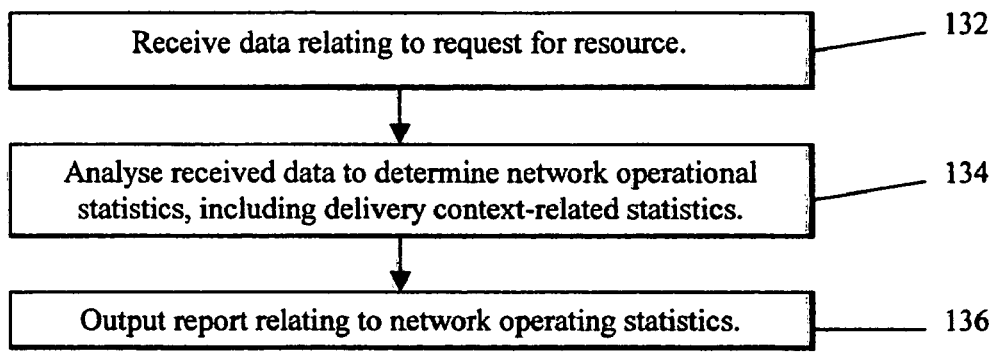
FIG. 10 is a flow chart illustrating the operation of an embodiment in which a central monitoring server determines network operational statistics.

FIG. 10 shows another process operating on the control processor of another network central delivery context activity monitor. The monitor receives data relating to delivery context activity from resource providers on the network, step 132 and analyses the data it receives, step 134, to determine network operational statistics, including delivery context—related statistics. Examples of such statistics may include the percentage of one or more of: requests for resource that have delivery context information associated with them; the percentage of requests for resource from particular kinds or classes of client device that are not serviced properly; the percentage of requests for resource which have vocabulary problems; the percentage of requests for resource which have problems accessing reference profiles; the percentage of requests for resource which use profile differences; to give non-exhaustive examples.

The monitor then outputs a signal, step 136. The signal may comprise a report relating to the network operating statistics, and/or a control signal to modify the behaviour of at least a part of the network.

Figure 11:
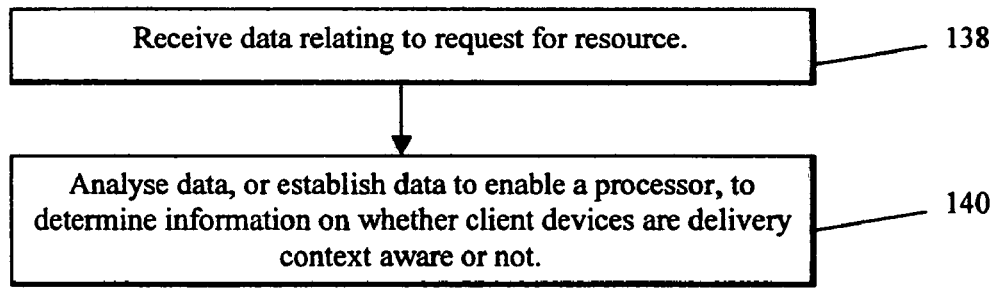
FIG. 11 is a flow chart illustrating the operation of an embodiment which determines whether client devices are delivery context aware or not.

FIG. 11 shows another process occurring on a control processor of either a resource server or a central systems delivery context monitor, or on both.

The processor receives, in step 138, data relating to requests for resources and in step 140 establishes data to enable a processor to determine whether client devices which make requests for resource are including delivery context related information in their requests for resource. Alternatively the processor may analyse the data for determining that itself.

Figure 12:
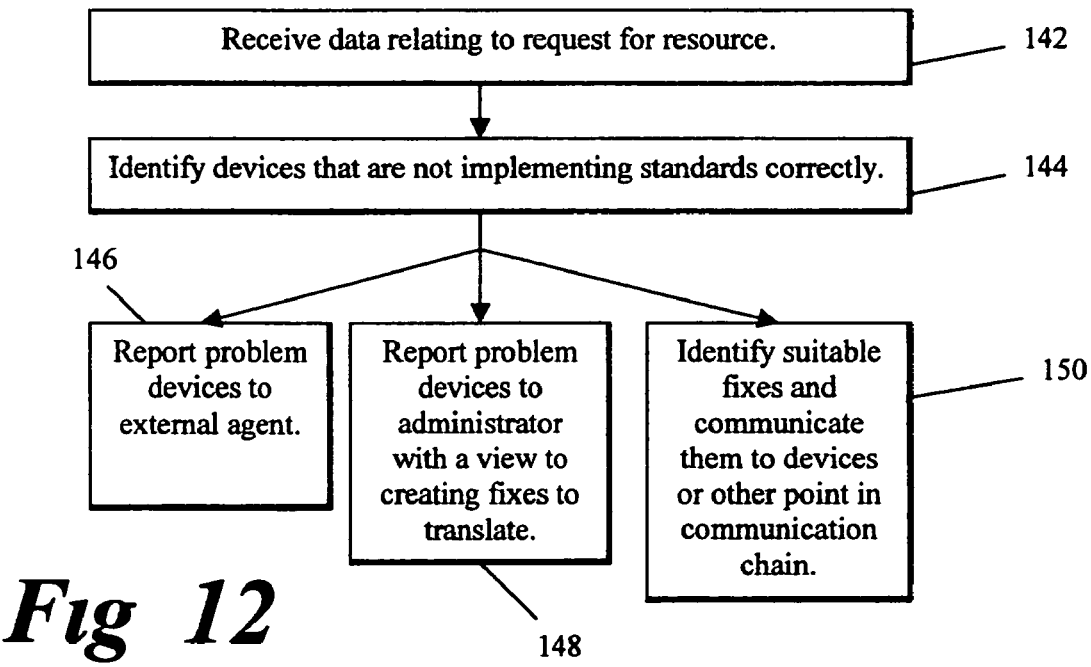
FIG. 12 is a flow chart illustrating the operation of an embodiment in which networked devices are not implementing standards correctly.

FIG. 12 shows a process occurring on a control processor of a network control delivery context activity monitor. The monitor receives data relating to requests for resources, step 142, and identifies, step 144, devices, whether they be resource serving devices, such as servers, or client devices, that are not identifying or implementing reference profile standards correctly.

The monitor then may report the problem devices to an external agent, step 146. This may involve informing the operator of a server that their server is not operating correctly, and/or informing the controlling party responsible for a reference profile repository that a reference profile has an error, and/or informing a party that controls particular devices (e.g. a manufacturer of client devices, mobile phone manufacturer, or servers, or a retailer, or licensor/licensee of equipment) that their equipment is not implementing a reference profile correctly.

Step 148 of FIG. 12 illustrates another option, which is to report problems to a systems administrator with a view to them creating compensating software which can be used to fix the problem, without involving, necessarily, other parties. The administrator/company that produces the fixes can then offer them to other parties who would find them useful.

An alternative illustrated in step 150 is for the system administrator or the monitor processor itself, to identify or create suitable software fixes and to communicate such fixes to relevant equipment in the network, whether that be content servers, client devices, or intermediate devices in the telecommunications network.

Figure 13:
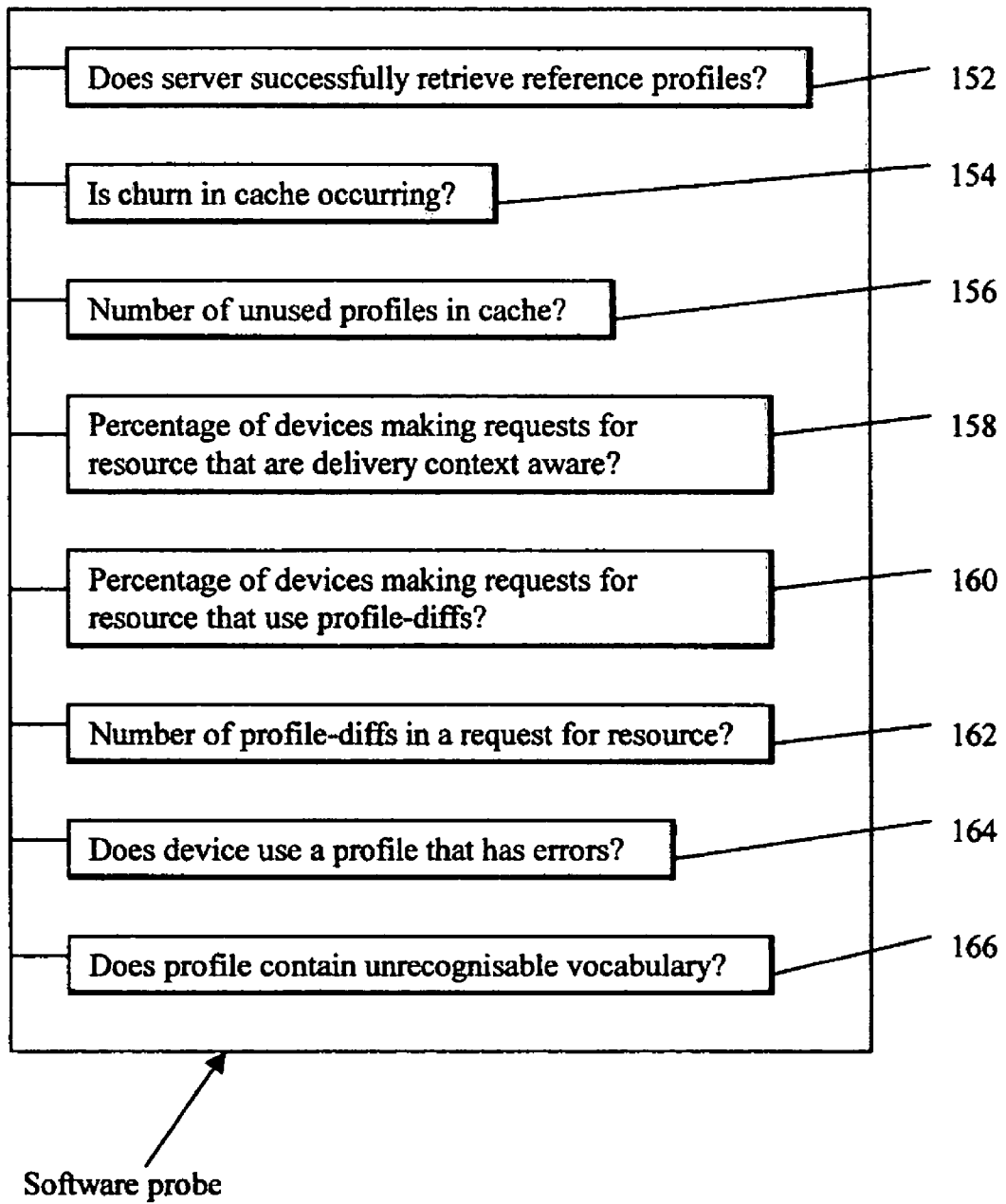
FIG. 13 illustrates schematically the software probe used for acquiring delivery context aware activity.

FIG. 13 schematically illustrates the software probe, or computer program product, discussed on pages 24 and 25. This software probe can relay information determined by any one of steps 152 to 166 to a central monitoring device.

Step 152 concerns whether the server can successfully retrieve reference profiles, whether from a repository or from a cached copy. This is determined every time a request for a reference profile is received.

Step 154 comprises a check that churn is not occurring in the reference profile cache. This occurs where the cache size is set too low, and a reference profile is deleted each time a new profile is added to the cache. This can be determined by monitoring the frequency of deletes from the profile cache.

Where the cache size is set too large, a large number of unused profiles are stored in the cache. Step 156 shows a way of assessing whether there are unused, or infrequently used, reference profiles in the cache. When a profile enters the cache it is associated with a time stamp. There is also associated with each reference profile a counter indicating the number of times it has been retrieved. A measure of unused profiles can be determined by dividing the number of retrievals of a reference profile by the time elapsed since the time stamp. Smaller values indicate increasingly unutilised profiles.

Step 158 illustrates an assessment of the percentage of devices making requests for resource that one delivery context aware. This can be determined by dividing the number of requests containing delivery context information by the total number of requests made.

Similarly, in step 160, an assessment is made of the percentage of devices using profile-diffs. This can be determined by dividing the number of requests for resources made containing profile-diffs by the total number of requests for resources made.

Sometimes a request for resource from a device has multiple profile-diffs. In step 162 the actual number of profile-diffs recited in a request for resources is used to determine if the request has been received via one or more intermediate devices, which have added their own profile-diffs. This number of profile-diffs can be determined at profile resolution. This information is useful in assessing the network penetration of delivery context-aware devices.

Step 164 comprises a check to determine whether a device is using a profile that has errors. This can be determined during profile resolution. The errors can be due to an invalid CC/PP or UAProf being used to specify the devices' capabilities.

Step 166 is concerned with establishing whether a profile references an unrecognisable vocabulary. This could be due to the fact that the server has not been pre-configured for the vocabulary, or that it cannot be retrieved from a repository. This is also determined at profile resolution.

It will be appreciated that there are many types of network with which the invention can be used: wireless, packet switched (e.g. running on electrical cable, for example co-axial cable, or optical fibre), circuit switched (an optical or electrical cable), satellite, infra-red, microwave, to name only some.

Devices which are envisaged as benefiting from the invention include: telephones (e.g. cellular, satellite, land line), digital televisions, decoders for televisions (e.g. set-top boxes), cable and satellite televisions, vehicle telemetry systems, wearable computers, tablet computers, Personal Digital Assistants, communications devices, printers, fax machines, and smart phones. Again, this is a non-exhaustive list: any device which is networkable and makes request for resources may be able to benefit from using the invention.

The invention claimed is:

1. A networkable resource server adapted in use to serve out resources to client devices of a network, the server having delivery context aware activity software to tailor the delivery and presentation of the resources according to a specific client device delivery context, wherein running the delivery context aware activity software on a processor of the server causes a report to be produced containing data related to and indicative of a level of delivery context aware requests, received by the server, for resources, wherein the report includes information concerning characteristics of the server, network characteristics linking the server and the client devices, characteristics of the client devices, and characteristics of any intermediary devices in a network path between the client devices and the server, wherein the report is sent out periodically to a master monitoring processor, to thereby notify the master monitoring processor of context delivery related information that has changed since the master monitoring processor was last updated, and wherein the resources served to the client devices comprise at least one of data works, files, e-mails, or software for use by a client device independently of the server;

wherein the server further comprises a profile resolver which receives from at least one of the clients details of a profile difference, and details of a reference profile related to the at least one of the clients, and which references a cache memory to create a profile of the at least one client device using a profile-diff transmitted to the server by the at least one client device and the reference profile retrieved from the cache memory: and wherein the server is configured to modify the cache memory in response to the delivery context aware software, and wherein modifying the cache memory includes changing the size of the cache memory, and wherein the report is a first report and the server is a component of a system for serving out resources to client devices of the network, the system further comprising:

a second server adapted to produce a second context aware activity report; and a network-wide delivery context aware activity monitor for processing the first report and the second report;

wherein the network-wide delivery context aware activity monitor produces a common report based on the first report and the second report.

2. A server according to claim 1 adapted to transmit the report externally of the server to another processor.

3. A server according to claim 1 in which there is provided a data log held in a data log memory, the data log being adapted to store data on activity of the server, including information on delivery context aware activity, and wherein the delivery context aware activity software is adapted to interrogate the data log to obtain the data related to delivery context aware requests for resources received by the server.

4. A server according to claim 1 adapted proactively to send out said report onto the network to which the server is connected.

5. A server according to claim 1 wherein the report relates to a plurality of context delivery aware requests for resources.

6. A server according to claim 1, wherein the report is sent out periodically to the master monitoring processor at a fixed update frequency.

7. A server according to claim 1, wherein the report includes information as to a fraction of client devices that are currently seeking resources from the server that use profile differences.

8. A server according to claim 1, wherein the report includes information selected from the following:

success rate for requests made by the server to obtain reference profiles;

whether churn is occurring in a cache of reference profiles;

a level of usage of specific profiles in a cache of reference profiles;

a proportion of requests for resource received by the server that contain delivery context information;

errors detected in reference profiles;

vocabulary in a profile that is unrecognized by the server;

a proportion of requests for resources, or of client devices making requests for resources, that use profile differences;

a number of intermediary devices and/or settings that influence the delivery context.

9. A server according to claim 1, further comprising a report compiler adapted to generate the report.

10. A server according to claim 9, wherein the report compiler is adapted to generate a report of data relating to the delivery context activity.

11. A server according to claim 1, wherein the server comprises a plurality of servers each adapted to produce a server-specific report and each of the plurality of servers further comprising a forwarding module for forwarding the server-specific report to a network-wide delivery context aware activity monitor.

12. A server according to claim 1, wherein the report contains information relating to the capabilities of at least one of the client devices to receive, process, and display the resources.

13. A server according to claim 1, wherein the report includes the following information:

success rate for requests made by the server to obtain reference profiles;

whether churn is occurring in a cache of reference profiles;

a level of usage of specific profiles in a cache of reference profiles;

a proportion of requests for resource received by the server that contain delivery context information;

errors detected in reference profiles;

vocabulary in a profile that is unrecognized by the server;

a proportion of requests for resources, or of client devices making requests for resources, that use profile differences; and a number of intermediary devices and/or settings that influence the delivery context.

14. A server according to claim 1, wherein the delivery context aware activity software tailors the delivery and presentation of the resources according to a specific client device type and screen size.

15. A server according to claim 1, wherein the specific client device delivery context comprises provider device capabilities.

16. A server according to claim 1, wherein the specific client device delivery context comprises client device capabilities.

17. A server according to claim 1, wherein the specific client device delivery context comprises configured settings on the client device.

* * * * *

UNITED STATES PATENT AND TRADEMARK OFFICE
CERTIFICATE OF CORRECTION

| | | |
|---|---|---|
| PATENT NO. | : 7,870,245 B2 | Page 1 of 1 |
| APPLICATION NO. | : 10/695948 | |
| DATED | : January 11, 2011 | |
| INVENTOR(S) | : Mark Henry Butler | |

It is certified that error appears in the above-identified patent and that said Letters Patent is hereby corrected as shown below:

In the drawings:

On Sheet 4 of 9, in Fig. 4, delete " V lcabulary Rep sit ry " and insert -- Vocabulary Repository --, therefor.

In column 21, line 8, in Claim 1, delete "memory:" and insert -- memory; --, therefor.

Signed and Sealed this
Twenty-sixth Day of April, 2011

David J. Kappos
*Director of the United States Patent and Trademark Office*